United States Patent [19]

Waring, Jr.

[11] 3,951,520
[45] Apr. 20, 1976

[54] COLOR IMAGING USING THE CHRISTIANSEN EFFECT

[75] Inventor: Robert Kerr Waring, Jr., Wilmington, Del.

[73] Assignee: E. I. Du Pont de Nemours and Company, Wilmington, Del.

[22] Filed: Oct. 16, 1974

[21] Appl. No.: 515,406

[52] U.S. Cl............................ 350/160 R; 350/160 P; 350/162 SF; 350/312
[51] Int. Cl.².......................... G02B 5/23; G02F 1/19
[58] Field of Search............... 313/465; 350/160 R, 350/160 P, 162 SF, 168, 267, 311, 312; 204/157.1 R; 178/7.86

[56] References Cited
UNITED STATES PATENTS

| | | | |
|---|---|---|---|
| 3,269,847 | 8/1966 | Cohen | 204/157.1 R X |
| 3,436,353 | 4/1969 | Dreyer et al. | 350/312 X |
| 3,530,233 | 9/1970 | Chai et al. | 350/312 UX |
| 3,586,417 | 6/1971 | Fields | 350/312 X |

*Primary Examiner*—Paul L. Gensler

[57] ABSTRACT

A Christiansen cell is formed using a dispersion of two immiscible condensed phases having different optical dispersion curves, but with matching refractive indices in the vicinity of the visible spectrum. The refractive index of one phase is imagewise changed by photopolymerization, photoreduction or other photochemical reaction, or by physical means such as heat, so that the cell will transmit unscattered and scattered light components. The scattered and unscattered components can be separated by spatial filtering, and imaged to form colored images.

13 Claims, 7 Drawing Figures

U.S. Patent   April 20, 1976   3,951,520
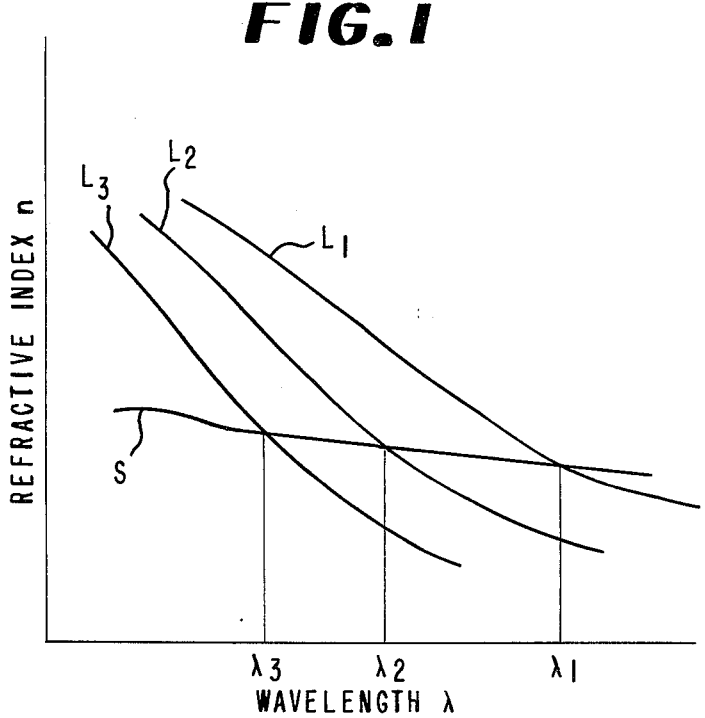
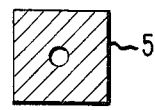
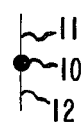
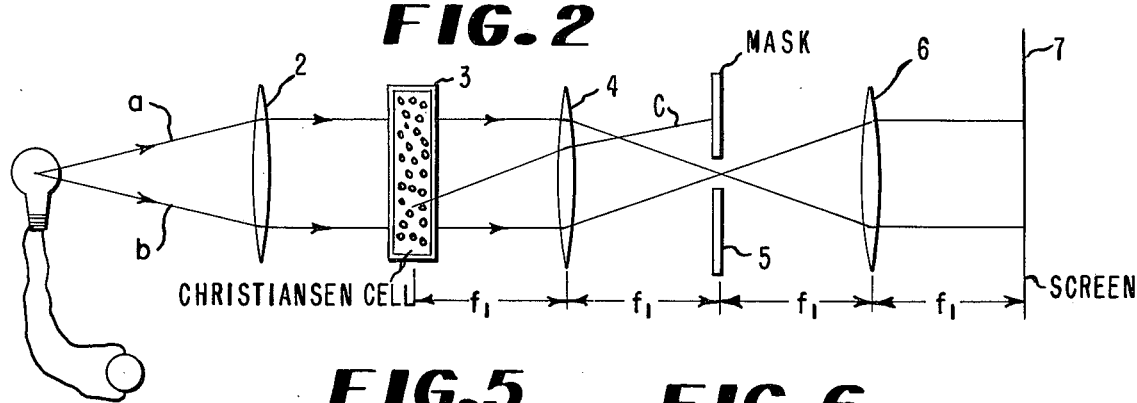
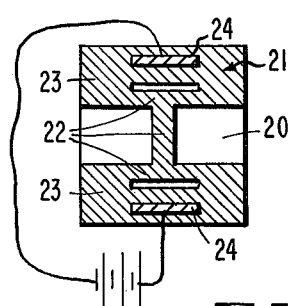
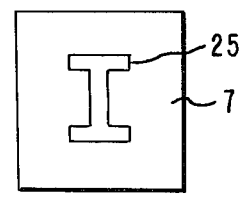
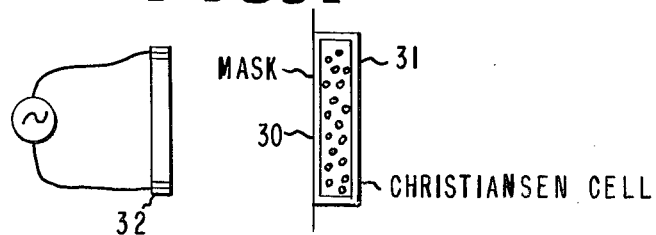

COLOR IMAGING USING THE CHRISTIANSEN EFFECT

BACKGROUND OF THE INVENTION

1. Field of the Invention

This invention relates to a method of forming color images by imagewise modulation of the Christiansen effect.

2. Description of the Prior Art

It is well known that, in general, a train of light waves changes direction, i.e., is refracted, when it crosses a boundary separating two media of different indices of refraction and that, except in special cases, only a portion of the incident light passes into the second medium, the remainder being reflected. The directions of propagation of both the reflected and transmitted waves are different from that of the incident wave. These phenomena are exploited in the Christiansen filter which produces a narrow band-pass of color and which has application in the infrared and ultraviolet as well as in the visible region. This filter was first described by C. Christiansen in 1884. The Christiansen filter consists of a finely divided transparent material suspended in an optically homogeneous medium; the constituents are chosen so that they have different but intersecting dispersion curves, i.e. the refractive indices are identical at a particular wave length $\lambda_c$ in or near the visible region, but differ for all other wave lengths. The filter is optically homogeneous for light of wave length $\lambda_c$, i.e., such light is unaffected and passes through the filter without deviation or reflection. However, for all other wave lengths the filter is optically heterogeneous and such light is scattered as a result of the refraction and reflection which occur at the particle-medium interfaces. The degree of scattering for a given wave length depends on the difference in the two refractive indices at that wave length so that greater scattering is expected for wave lengths farther from $\lambda_c$. Consequently, the transmission curve for the unscattered light exhibits a maximum at $\lambda_c$.

Several applications based on the Christiansen filter effect are known. Fields, U.S. Pat. No. 3,586,417 describes a variable color filter. A change in temperature results in different shifts in the dispersion curves of the two constituents thereby changing $\lambda_c$ and the color transmitted. One of the references given in the Fields patent is E. D. McAlister, Smithsonian Misc. Collections 93, No. 7 (1935) which describes such temperature-tunable filters made in the 1920's and 1930's. Matovich, I.S.A. Journal 12, 53 (1965) describes a variable color filter in which the change in $\lambda_c$ is achieved by applying external pressure thereby shifting the dispersion curve of the liquid. George U.S. Pat. No. 3,458,249 describes an optical filter which has a notched region (a high absorption region) within the pass band so that light corresponding to the wave length of the notch is not transmitted but light of higher and lower wave length within the pass band is transmitted. Barnes and Bonner, Phys. Rev. 49, 732 (1936) describe infrared Christiansen filters and the above McAlister reference discusses the ultraviolet filters reported by von Fragstein in 1932–1933. The Christiansen effect is responsible for the colors in the chromatic emulsions of the type prepared by Holmes and Cameron (J. Am. Chem. Soc. 44, 71 (1922)).

No prior art exists that discloses the process of forming color images by imagewise modulation of the Christiansen effect. Strong (Concepts of Classical Optics, Freeman, San Francisco 1958, p. 583) states that the Christiansen filter "cannot be used in an image-forming system —e.g. in front of a camera lens." The Christiansen cell is considered by Strong and others as a filter; there is no suggestion of storing information either temporarily or permanently by adjusting the properties of the Christiansen cell itself which when illuminated results in the desired color image.

In somewhat related work, Taylor (Proc. of the IEEE 61, 148 (1973)) describes a reflective liquid-vapor display principle involving vaporization of a film of transparent liquid from a roughened glass surface. The liquid, glass, and transparent electrodes needed to heat the liquid are chosen with matching indices of refraction so that when the liquid wets the glass, the system is transparent and the viewer sees through to the back wall of the cell which may be black or a color. When the liquid is evaporated so that a vapor (of different index of refraction) forms around the roughened surface, scattering occurs and the viewer sees the translucent whitish appearance of roughened glass. An off-condition color can also be obtained by dyeing the liquid the appropriate color. The display consists of the whitish image on a uniform black or color background. This method of display does not utilize the Christiansen effect.

SUMMARY OF THE INVENTION

The method of forming colored images of the present invention comprises forming a dispersion of two immiscible condensed phases, usually a solid in a liquid phase to form a Christiansen cell. Both phases have dispersions of refractive index different from each other, but with indices of refraction matching at one wavelength in the vicinity of the visible region of the spectrum. The refractive index of one phase (or both) is then imagewise changed so that the matching wavelength changes imagewise. Light is passed through the cell, the scattered component and unscattered component of the light emerging from the cell are separated and either component is them focused to form a colored image.

THE DRAWINGS AND DETAILED DESCRIPTION OF THE INVENTION

In the drawings which accompany this specification

FIG. 1 is a diagram illustrating the manner in which varying the refractive index of one component will vary the color of light directly transmitted through a Christiansen filter.

FIG. 2 is a diagram illustrating an embodiment of this invention.

FIG. 3 is a plane view of a stop employed for spatial filtering in the embodiment of FIG. 2.

FIG. 4 illustrates an alternative form of stop for use in the apparatus of FIG. 2 to produce an image of complementary color.

FIG. 5 shows a configuration of transparent heating elements on a substrate for use as a containing wall in a Christiansen cell whereby a colored image can be produced by heat.

FIG. 6 illustrates the form of the image obtained with the electrode configuration of FIG. 5.

FIG. 7 illustrates apparatus for varying the liquid medium of the Christiansen cell imagewise by photochemical methods.

The present invention employs a Christiansen cell which is modulated imagewise by locally varying the refractive index of one or more of the two component phases.

Preferably, the Christiansen cell will contain a solid medium which is transparent through the visible region of the spectrum. In the present invention it is strongly preferred to employ ground glass, glass spheres or the like as the solid medium.

The solid medium is immersed or suspended in a liquid medium, the aggregate of solid and liquid forming a Christiansen cell. To obtain the necessary optical properties, the aggregate is confined in a cell, e.g., a slurry of the solid in the liquid is held between two spaced plates, which are likewise transparent in the visible region of the spectrum. If imaging is to be performed photochemically using actinic light, the plates employed to confine the solid and liquid aggregate must also be transparent to the imaging radiation.

Turning now to FIG. 1, the diagram is a hypothetical plot of the variation of refractive index ($\eta$) with wavelength $\lambda$ in the vicinity of the visible region of the spectrum intended to illustrate this invention. S represents the variation of refractive index of the solid with wavelength and $L_1$ represents the variation of the refractive index of the liquid with wavelength. The curves $L_1$ and S intersect at the matching wavelength $\lambda_1$. For light of wavelength $\lambda_1$, the contents of a Christiansen cell composed of a powdered solid suspended in liquid will be optically homogeneous. Thus, such a cell will pass light of $\lambda_1$ substantially unchanged in direction assuming the cell has parallel walls. Light of wavelengths substantially different from $\lambda_1$ will be scattered. The band pass of the cell will be determined by the relative slopes of dispersion curves S and $L_1$.

Light of wavelength $\lambda_1$ forms the background of the image in the instant invention when the unscattered component of light transmitted by the cell is employed. $\lambda_1$ may be in the visible region of the spectrum whereupon the background will be colored. Alternatively, $\lambda_1$ can be just outside the visible region of the spectrum whereupon the background will be dark. If the refractive index is changed imagewise the dispersion curve will shift, say, to $L_2$, and the matching wavelength will shift to $\lambda_2$. A greater degree of change will further shift the dispersion curve to $L_3$ with matching point $\lambda_3$. Both $\lambda_2$ and $\lambda_3$ should be in the visible region of the spectrum to project an observable image. Further, it will be apparent that, although the greater the difference in the slopes of the dispersion curves, the more pure is the color transmitted by the cell, the greatest change in wavelength for a given change of refractive index is obtained when the dispersion curves for the liquid have slopes which differ only slightly from that of the solid. It will be evident that similar results will be obtained when curve S is varied, or when both curve S and curve $L_1$ are varied in differing degrees.

FIG. 2 shows the method of obtaining an image of the unscattered light passing through a Christiansen cell. A white light source is collimated by lens 2. The beam of light represented by rays $a$ and $b$ impinges on a Christiansen cell 3 containing a suspension of a powdered solid, for example, glass suspended in a liquid having an appropriate dispersion characteristic. Light of the matching wavelength passes undeflected through the cell and is brought to a focus by imaging lens 4. A spatial filter consisting of a small aperture in an opaque screen 5 permits passage of the undeflected light which is then imaged by lens 6 on screen 7. Where light of wavelength $\lambda_m$ is transmitted unscattered by a portion of the cell, the image of that portion of the cell will appear on screen 7 in the color $\lambda_m$. Substantially all light scattered by the cell such as ray c is not brought to a focus by lens 4 and is stopped by the spatial filter 5. FIG. 3 is a plane view of spatial filter 5. If, instead of an aperture, a small stop such as that shown by 10 in FIG. 4, which is supported at the focus by thin wire supports 11 and 12 is employed as the spatial filter, the component of light scattered by Christiansen cell 3 will pass the spatial filter and can be imaged on screen 7 to obtain an image in colors complementary to those obtained when the undeflected light component is imaged on the screen.

Various methods can be employed to change the refractive index of the components of a Christiansen cell imagewise, including both physical and chemical changes.

FIG. 5 illustrates an electrode configuration which can be used to produce an image by thermal heating. In FIG. 5, a glass plate 20 has deposited thereon a transparent conducting layer 21. Current introduced to layer 21 at connection pads 24 is constrained to flow along the thin, current constricting strips 22 thereby heating them. Connection of the narrow strips 22 is through broad bands 23 which stay cool because of their lower resistivity. The transparent electrode is provided with connections to an electrical current supply, shown symbolically, and is covered with a thin insulating layer of a transparent dielectric. A Christiansen cell is then constructed using the plate of FIG. 5 as one face of the cell with the transparent electrode adjacent the cell contents. The cell is placed in an apparatus such as that shown in FIG. 2 to observe the image. Assuming refractive index of the liquid phase decreases with increasing temperature considerably more rapidly than the refractive index of the solid, as is usually the case, the refractive index of the cool liquid is adjusted so that the matching point is in the near infrared region of the spectrum. On passing current through the conductor 21, an image will be obtained as shown by outline 25 in FIG. 6 corresponding to the heated paths 22. This image changes in color from red through the colors of the spectrum to blue with increasing current.

Photochemical reactions can be employed to modify the refractive index imagewise in suitable systems. It is preferred to employ a chemical change based on the partial or total photopolymerization of a photoreactive liquid monomer in which is suspended a ground dense glass such as barium crown or a finely divided powder of an essentially optically isotropic crystalline solid such as $NH_4Cl$. A thin film of this suspension is prepared between two glass slides which are clamped together in an aluminum slide frame. This Christiansen cell is then exposed to actinic light to partially polymerize in an imagewise fashion the monomer thereby shifting the dispersion curve of the high dispersive power constituent in the light-struck area. The magnitude of this shift depends upon the degree of polymerization, i.e. the time of exposure. It is necessary that this partially reacted suspending medium remain optically homogenous.

Imagewise modulation of the Christiansen effect by partial or total photopolymerization of a suspending medium has been achieved with the photoreactive monomers 3-acryloxybenzophenone which is liquid at normal room temperatures; 1-naphthyl methacrylate which can exist as a supercooled liquid at room temperatures for months; 4-acryloxybenzophenone, pentachlorophenyl methacrylate, and 2-naphthyl methacrylate which are solid at normal room temperatures; and with various combinations of these monomers.

Christiansen cells made with a monomer which is solid at room temperatures can be prepared at temperatures above the monomer melting point and partial or total photopolymerization done in the molten state above the melting point or in a supercooled state before the monomer crystallizes. When crystallization eventually occurs, the illuminated areas do not crystallize but retain their Christiansen colors. The unilluminated areas crystallize and become strongly scattering for all visible wavelengths. Monomer diffusion across the boundary between crystalline unexposed area and amorphous exposed areas is greatly inhibited. Partially polymerized areas further polymerize with subsequent exposure to actinic light and corresponding changes in Christiansen colors result. However, although the color of the projected image may change, the geometrical form of the exposed pattern is retained since the background (crystallized area) is unreactive.

Monomers that are normally crystalline at the operating temperature can frequently be employed by depressing their melting points below the operating temperature or by finding a solvent that will dissolve enough monomer to provide a mixture that will undergo a sufficient refractive index change to cause a Christiansen color shift. Normally, it is preferred to add only a few percent diluent but 60 to 80 percent may be employed if the active ingredient undergoes sufficient change.

Photoinitiators such as benzoin methyl ether can be added to the monomers to shorten actinic exposure times. Inert constituents can be combined with the monomers to act as plasticizers (Aroclor 1260 chlorinated biphenyl), binders (Elvacite 2042 high molecular weight ethyl methacrylate, and polyvinyl naphthalene) and diluents to adjust refractive index and background color (1-monobromonaphthalene and methyl salicylate).

Another chemical change that has been demonstrated to provide imagewise modulation of the Christiansen effect is photoreduction, in particular, the photoreduction of benzophenone to benzopinacol. The glass powder is mixed with a solution of benzophenone, a proton source such as toluene or 2-propanol, and a solvent such as diphenyl ether to maintain a single reaction phase and to adjust the refractive index of the continuous phase to the desired level. The suspension is placed between glass slides as described above to form a Christiansen cell. Portions of the cell are then exposed to actinic light to photoreduce the benzophenone, with benzopinacol and oxidized alcohol as the products. The accompanying shift in the dispersion curve results in a change in the Christiansen color on projection for the exposed areas. The magnitude of the shift depends upon the degree of reduction, i.e., the time of exposure.

N-vinyl sulfonamides are known to undergo photoinitiated rearrangements which are believed to be produced by a free-radical chain mechanism according to the following equation.

Solutions of such materials dissolved in high refractive index solvents can be employed as the liquid medium in the process of this invention.

FIG. 7 shows a simple arrangement for imposing an image on a cell containing a liquid capable of undergoing photochemical reaction as one component of a Christiansen filter. A mask 30, which can be a photographic transparency is placed in contact with the cell 31 and the cell is illuminated with a lamp 32 for the predetermined time necessary to accomplish the desired effect. If the mask 30 contains areas of different optical density, different degrees of reaction will occur leading to different colors in the resultant image on projection. Changing the time of exposure further alters the color in the exposed areas on projection.

It will be evident that other optical arrangements capable of imaging the mask onto the cell can be devised in place of the simple system of FIG. 7.

Many other modifications will be apparent to those skilled in the art. Thus in place of glass powder any transparent isotropic material insoluble in the liquid medium can be used. Other solids include diffractive gratings, aligned or non-aligned fibers, cloth or porous solids such as the cellulose esters millipore filters and sintered glass pads.

Other methods of spatial filtering will likewise be evident to those skilled in the art.

This invention is further illustrated by the following specific embodiments, which should not however be construed as fully delineating the scope of this discovery.

In these embodiments, the apparatus of FIG. 2 was employed to project images from the Christiansen cell.

EMBODIMENTS OF THE INVENTION

EXAMPLE 1

Annealed, optical grade dense barium crown glass of refractive index 1.620 and low dispersive power (reciprocal optical dispersive power of 60.3) was crushed and then milled in an agate ball mill for 30 minutes. The fraction of the resulant powder that passed a 400 mesh (37 micron) screen was selected for use. An approximately 1% by weight solution of photoinitiator benzoin methyl ether in 3-acryloxybenzophenone high dispersive power liquid monomer was prepared. The glass powder was wet with this solution to yield a stiff paste. A small piece of the paste was placed at the center of a two-inch square glass slide, and a spacer frame of 0.001 inch thick oriented, heat-set poly(ethylene terephthalate) film was laid around the periphery of the slide. Air bubbles were removed from the paste by tapping and gentle heating. A second two-inch square glass slide was pressed over the first and moved about slightly to spread the past into a 0.001 inch thick film. The glass slides were clamped together in an aluminum slide frame.

Exposure to ultraviolet light was carried out in a simple optical system designed to project an image of a desired shape, e.g. an alpha-numeric character, onto the film. Collimated light from a 75 watt, high pressure,

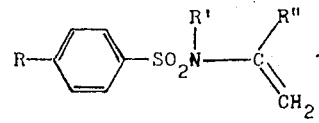 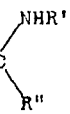

short arc mercury lamp illuminated an aperture of the desired shape in an opaque background. A lens was selected and placed to image the illuminated aperture onto the film at the desired magnification. Any source of ultraviolet light of wave length about 3660 A and any imaging method, including contact printing, could be employed. At 1:1 magnifications the exposure times to different areas of the film were varied from 45 seconds to 25 minutes. The background (unexposed) areas remained a deep blue-violet, while the Christiansen colors in the exposed areas, in unscattered transmitted light, varied from light blue-green to yellow. In scattered light, the complementary viewed colors varied from light yellow through deep blue-violet on a very pale yellow-green background. Intermediate colors were various shades of magenta.

When the 3-acryloxybenzophenone monomer was replaced with supercooled liquid 1-naphthyl methacrylate and the cell exposed as desired, an improved range of colors were observed in transmitted (unscattered) light as shown in Table I. The 1-naphthyl methacrylate used in this work remained liquid during exposure and viewing and for months thereafter with no sign of crystallization.

Table I

| Exposure Time (Sec) | Transmitted Color |
|---|---|
| 0 (background) | Dark Blue-Violet |
| 75 | Blue |
| 90 | Blue-Green |
| 105 | Green |
| 120 | Yellow |
| 180 | Red |

When the initiator concentration and the light intensity were varied, the exposure times required to obtain the observed transmitted colors were also modified. The use of initiator-free 1-naphthyl methacrylate gave similar colors, but substantially longer exposure times were required.

EXAMPLE 2

The experiment described in Example 1 was repeated with the 3-acryloxybenzophenone monomer replaced with 4-acryloxybenzophenone. Since this monomer is solid at 25°C, preparation of the Christiansen cell was carried out above the melting point of approximately 40°C. After preparation of the cell, the monomer remained in a supercooled liquid state for approximately 1 hour, and exposure to ultraviolet light was carried out at room temperature during this time period. The exposed, partially or totally polymerized areas remained amorphous and did not crystallize whereas the monomer in the unexposed areas eventually crystallized. When viewed in transmitted (unscattered) light, the background areas appeared black because the crystallites scattered light of all colors. The exposed areas retained their various colors. Upon subsequent exposure to ultraviolet light, crystallized areas were unaffected and hence "fixed." However, the partially polymerized areas were further polymerized which resulted in color changes in the pattern of transmitted light. Since 4-acryloxybenzophenone monomer shows relatively little diffusion across the boundary between crystalline unexposed areas and amorphous exposed areas, the geometrical form of the exposed pattern was retained.

When the 4-acryloxybenzophenone monomer was replaced with pentachlorophenyl methacrylate or 2-naphthyl methacrylate and the cells exposed as described, similar color images were obtained. Combinations of monomers could also be employed to produce color images.

EXAMPLE 3

The surface of a glass plate, coated with a transparent tin-indium oxide conducting layer, was scratched to define a constricted conducting path in the form of a short bar. Electric current, passed from one end of the plate to the other, was thereby constrained to pass along the bar. Because of the higher resistance there, resistive heating occurred and the area of the bar was heated above the surrounding disconnected area.

An 0.001 inch thick Christiansen cell was prepared by the method described in Example 1. The paste was prepared from barium crown glass and a suspending liquid of a 43/3 weight ratio of α-bromonaphthalene and methyl salicylate. This suspending liquid was selected to give a red Christiansen color in transmitted (unscattered) light at 25°C. The prepared cell was laid over the abovedescribed glass plate. It was thermally coupled to the plate with a layer of liquid. By adjusting the temperature, the transmitted color in the bar was varied from red through blue, all on the original red background, as the refractive index of the suspending liquid changed to match that of the glass at these colors. By further increasing the temperature, the refractive index match could readily be moved out of the visible to produce a black bar. In scattered light the background was blue-green, and the bar appeared magenta, yellow, or white as its temperature was increased. The effect was completely reversible and repeatable and can thus be used as the basis for a variable color display.

EXAMPLE 4

Reagent grade crystalline NH$_4$Cl of refractive index 1.639 was ground in a mortar to a fine powder of particle size less than 25 microns. A small amount of α-bromonaphthalene was added to 1-naphthyl methacrylate liquid monomer to raise the refractive index to about 1.62. The powdered NH$_4$Cl was wet with this solution to yield a stiff paste. A thin layer of the paste was prepared between glass plates in the manner of Example 1. Exposure to ultraviolet light was accomplished with the apparatus of Example 1. The background color of unexposed areas of the film was deep blue in unscattered light. After 30 minutes irradiation, the exposed area became a yellow-red color in unscattered light. Note that in this example no photoinitiator (e.g. benzoin methyl ether) was included with the photomonomer composition, which resulted in the observed low sensitivity of the film to the exposing light.

EXAMPLE 5

The portion of a powdered glass, designated SK 14 by Schott Optical Glass Company, that passed a 400 mesh screen was selected for use and 3.5 g of glass powder was mixed with a solution consisting of 2.0 g benzophenone, 1.5 g diphenylether and 0.3 g toluene. The mixture was placed between glass slides with a 1 mil separation as described in Example 1. The SK 14 glass has a nominal refractive index $n_D$=1.603 and the liquid solution before mixing with the glass an $n_D$=1.590 as measured on a Zeiss refractometer. Before imaging, transmitted light was blue and scattered light reddish-orange. Selected areas of the cell were exposed to ultraviolet light from a 75 watt, high pressure, mercury arc lamp. The range of Christiansen colors in the imaged areas as related to exposure times is indicated in Table II.

Table II

| Exposure Time (Min) | Transmitted Color | Scattered Color |
|---|---|---|
| 0 (background) | Blue | Reddish-Orange |
| 1 | Blue (no change) | Reddish-Orange |
| 5 | Faint Green | Reddish |
| 20 | Green | Reddish-Purple |
| 20 (higher light intensity) | Yellow | Violet |

When the 0.3 g toluene was replaced with 0.2 g 2-propanol, the range of colors obtained are shown in Table III.

Table III

| Exposure Time (Min) | Transmitted Color | Scattered Color |
|---|---|---|
| 0 (background) | Blue | Orange |
| 3 | Light Green | Reddish-Orange |
| 10 | Green | Reddish |
| 20 | Deeper Green | Reddish-Purple |
| 20 (higher light intensity) | Orange | Blue |

EXAMPLE 6

A mixture of the following ingredients was prepared:

0.15 g Arochlor 1260 (a commercially available chlorinated polyphenyl)
0.25 g N-vinyl carbazole
0.15 g 1-methylnaphthalene
0.05 g 10% by wt. solution benzoin methyl ether in 1-methylnaphthalene The mixture was warmed to effect solution of the solid N-vinyl carbazole, and a liquid that remained homogeneous on cooling was obtained. It has a refractive index of 1.650. To this mixture was added 0.65 g of a glass powder from an optical glass having a nominal refractive index, as reported by the manufacturer; of 1.651. The glass powder was prepared as described in Example 1 and had a particle size passing a 400-mesh screen. The combined liquid and glass powder was spread between glass slides separated by a 1 mil spacer to form a Christiansen cell. Examination showed golden yellow transmitted and blue scattered colors. Exposure of portions of the cell to uv light through an imaging mask for various times as in previous examples resulted in color changes as a function of exposure time. With increasing exposure, the transmitted color changed from golden yellow to orange to reddish brown while the scattered complementary colors shifted from blue to green to yellow green.

EXAMPLE 7

The following mixture was prepared in the proportions indicated.

0.30 g N-α-styryl-N-p-methoxyphenyl-p-toluene-sulfonamide
0.40 g diphenyl ether
0.50 g 10% by wt. benzoin methyl ether in 1-methylnaphthalene The mixture was warmed until a homogeneous solution was obtained. A portion of the material was placed between glass slides separated by a 5 mil peripheral spacer and exposed for one hour to uv light of the type used in previous examples. A sample of the exposed mixture had a refractive index of 1.603 as compared with a value of 1.596 for unexposed material, indicating that a refractive index change had taken place as a result of the exposure. A second portion of the unexposed material was mixed with a powdered glass, prepared as described in previous examples and having a nominal refractive index of 1.60, to form a fluid paste. This mixture, in a Christiansen cell 1 mil thick, showed a light blue transmitted color and a reddish orange scattered color. One, two and five minute exposures of portions of the cell to uv light produced yellow green, yellow and yellow orange transmitted colors and corresponding magenta, purple and blue scattered colors, indicating modulation of the Christiansen image as a function of light exposure.

The embodiments of the invention in which an exclusive property or privilege is claimed are defined as follows:

1. A method of forming colored images by projection comprising forming a Christiansen cell consisting of a first condensed phase dispersed in a second condensed phase, said first phase having a dispersion of refractive index differing from that of said second phase, but having a refractive index at one matching wavelength in the region of the visible spectrum matching the refraction index of said second phase; locally varying the refractive index of at least one said phase whereby said matching wavelength is locally changed in accordance with a predetermined image, passing light through said cell, separating a scattered light component from an unscattered light component, and imaging one of said scattered light component or said unscattered light component.

2. Method of claim 1 wherein said first phase is a solid powder dispersed in a liquid second phase.

3. The method of claim 2 wherein the refractive index is locally changed by locally heating the Christiansen cell in accordance with a predetermined image.

4. Method of claim 2 wherein said solid powder is glass.

5. The method of claim 4 wherein said liquid is a liquid which reacts chemically in actinic light, thereby changing the refractive index, said change being induced locally by the action of actinic light spatially modulated in accordance with a predetermined image.

6. the method of claim 5 wherein the liquid is a solution of N-α-styr-N-p-methoxyphenyl-p-toluene sulfonamide, and the refractive index is varied by a photoinitiated rearrangement reaction.

7. The method of claim 5 when said liquid is a photopolymerizable liquid.

8. The method of ciaim 7 when said liquid consists essentially of 3-acryloxybenzophenone containing an initiating amount of a photoinitiator.

9. The method of claim 7 when said liquid consists essentially of 1-naphthyl methacrylate and an initiating amount of a photoinitiator.

10. The method of claim 7 when said liquid consists essentially of 4-acryloxybenzophenone and an initiating amount of photoinitiator.

11. The method of claim 5 when said liquid is a photoreducible liquid.

12. The method of claim 11 when said liquid is a solution of benzophenone and a hydrogen source.

13. A Christiansen cell having as its operating element a dispersion of glass powder in a liquid, said liquid capable of undergoing a chemical change upon exposure to actinic light.

* * * * *